(12) United States Patent
Momoi

(10) Patent No.: US 11,313,533 B2
(45) Date of Patent: Apr. 26, 2022

(54) LIGHT FLUX CONTROLLING MEMBER, LIGHT EMITTING DEVICE, SURFACE LIGHT SOURCE DEVICE AND DISPLAY DEVICE

(71) Applicant: Enplas Corporation, Saitama (JP)

(72) Inventor: Takuro Momoi, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 17/204,047

(22) Filed: Mar. 17, 2021

(65) Prior Publication Data

US 2021/0293396 A1 Sep. 23, 2021

(30) Foreign Application Priority Data

Mar. 18, 2020 (JP) .............................. JP2020-047743

(51) Int. Cl.
*F21V 5/04* (2006.01)
*G02F 1/1335* (2006.01)
*F21V 33/00* (2006.01)
*F21V 5/00* (2018.01)

(52) U.S. Cl.
CPC .............. *F21V 5/046* (2013.01); *F21V 5/007* (2013.01); *F21V 33/0052* (2013.01); *G02F 1/133607* (2021.01)

(58) Field of Classification Search
CPC .............. F21V 5/046; F21V 5/04; F21V 5/007
See application file for complete search history.

(56) References Cited

U.S. PATENT DOCUMENTS

| 10,190,730 B2* | 1/2019 | Yamada ................... F21V 3/00 |
| 10,488,562 B2* | 11/2019 | Chang ..................... F21V 5/046 |
| 2015/0260371 A1* | 9/2015 | Takatori ............. G02B 19/0047 362/97.1 |
| 2017/0115531 A1 | 4/2017 | Hiraka |
| 2017/0328537 A1* | 11/2017 | Fukuda ..................... F21V 5/04 |
| 2018/0188608 A1* | 7/2018 | Fujii ................. G02F 1/133603 |
| 2019/0293262 A1* | 9/2019 | Yin ......................... F21V 17/04 |
| 2020/0141557 A1* | 5/2020 | Mochida ............... G06F 1/1637 |

FOREIGN PATENT DOCUMENTS

JP 2015-197624 11/2015

* cited by examiner

*Primary Examiner* — Julie A Bannan

(57) ABSTRACT

A light flux controlling member includes an incidence surface, a reflection surface, an annular groove and an emission surface. The annular groove is disposed so as not to intersect an optical path of light incident on the incidence surface, reflected by the reflection surface, and reaching the emission surface. The first annular surface is formed so that its distance from the central axis increases, from the back side to the front side, and refracts, toward the front surface, light emitted from the light emitting center of the light emitting element, and directly reaching the first annular surface. The second annular surface is formed so that its distance from the central axis increases, from the back side to the front side, and refracts, toward the front side, light emitted from the light emitting element, incident on the incidence surface, and directly reaching the second annular surface.

17 Claims, 13 Drawing Sheets

LIGHT FLUX CONTROLLING MEMBER, LIGHT EMITTING DEVICE, SURFACE LIGHT SOURCE DEVICE AND DISPLAY DEVICE

CROSS REFERENCE TO RELATED APPLICATIONS

This application is entitled to and claims the benefit of Japanese Patent Application No. 2020-047743, filed on Mar. 18, 2020, the disclosure of which including the specification, drawings and abstract is incorporated herein by reference in its entirety.

TECHNICAL FIELD

The present invention relates to a light flux controlling member for controlling the distribution of light emitted from a light emitting element. The present invention also relates to a light emitting device, a surface light source device, and a display device which include the light flux controlling member.

BACKGROUND ART

Transmitting image display devices such as liquid crystal display devices may use a direct surface light source device as a backlight. In recent years, direct surface light source devices each including a plurality of light emitting elements as the light source are used.

A direct surface light source device includes a substrate, a plurality of light emitting elements, a plurality of light flux controlling members, and a light diffusion member. The plurality of light emitting elements is disposed in a matrix on the substrate. The light flux controlling member that expands light emitted from each light emitting element in the planar direction of the substrate is disposed over the light emitting element. The light emitted from the light flux controlling member is diffused by the light diffusion member to illuminate a member to be irradiated (e.g., a liquid crystal panel) in a planar fashion (see, e.g., Patent Literature (hereinafter, referred to as PTL) 1).

PTL 1 discloses a surface light source device including a casing, a substrate disposed inside the casing, at least one light emitting element disposed on the substrate, and a light flux controlling member which is disposed so as to cover the light emitting element and which controls the distribution of light emitted from the light emitting element, and a light diffusion member that transmits the light emitted from the light flux controlling member while diffusing the light. The light flux controlling member includes an incidence surface that allows incidence of light emitted from the light emitting element, a reflection surface which is formed on the opposite side of the incidence surface and laterally reflects the incident light, an annular groove formed outside the incidence surface, and an emission surface which emits the light reflected by the reflection surface.

Light emitted from the light emitting element enters the light flux controlling member from the incidence surface. Light having entered the light flux controlling member is reflected toward a side of the light flux controlling member by the reflection surface. A part of the light reflected by the reflection surface passes through the annular groove and then is emitted from the emission surface to the outside of the light flux controlling member. Another part of the light reflected by the reflection surface is emitted from the emission surface to the outside of the light flux controlling member without passing through the annular groove.

CITATION LIST

Patent Literature

PTL1
Japanese Patent Application Laid-Open No. 2015-197624

SUMMARY OF INVENTION

Technical Problem

In the surface light source device disclosed in PTL 1, a part of the light emitted from the emission surface is emitted toward the light diffusion member as the light is refracted toward the light diffusion member side by the annular groove. As described above, a part of the light emitted from the light emitting element may be emitted in the direction directly above the light flux controlling member in the surface light source device according to PTL 1, and thus the uniformity on the light diffusion member is more likely to be affected by the distance between the light flux controlling member and the light diffusion member.

An object of the present invention is to provide a light flux controlling member capable of achieving high uniformity on a light diffusion member without being affected by the distance between the light flux controlling member and the light diffusion member.

In addition, another object of the present invention is to provide a light emitting device, a surface light source device, and a display device which include the light flux controlling member.

Solution to Problem

For achieving the above object, the light flux controlling member according to the present invention is a light flux controlling member that controls a distribution of light emitted from a light emitting element, the light flux controlling member including: an incidence surface disposed on a back side so as to intersect a central axis of the light flux controlling member, the incidence surface being for allowing incidence of the light emitted from the light emitting element; a reflection surface disposed on a front side so that a height of the reflection surface from the light emitting element increases as a distance of the reflection surface from the central axis increases, the reflection surface being for laterally reflecting the light incident on the incidence surface; an annular groove that includes a first annular surface located farther from the central axis than the incidence surface is and disposed on the back side so as to surround the central axis, and a second annular surface located farther from the central axis than the first annular surface is and disposed to be separated from the first annular surface, the first annular surface being disposed on a side of the central axis in the annular groove; and an emission surface located farther from the central axis than the annular groove is and disposed so as to surround the central axis, the emission surface being for emitting the light reflected by the reflection surface, in which the annular groove is disposed so as not to intersect an optical path of light emitted from a light emitting center of the light emitting element, incident on the incidence surface, reflected by the reflection surface, and then reaching the emission surface, in a cross section including the central axis, the first annular surface is an inclining surface whose height from the light emitting element increases as a distance of the first annular surface from the central axis increases, the first annular surface refracting toward the front side, light emitted from the light emitting center of the light emitting element, incident on the incidence surface, and then directly reaching the first annular surface, and in the cross section including the central axis, the second annular surface is an inclining surface whose height from the light emitting element decreases as a distance of the second annular surface from the central axis decreases, the second annular surface refracting, toward the front side, light emitted from the light emitting element and directly reaching the second annular surface.

A light emitting device according to the present invention includes a light emitting element and the light flux controlling member according to the present invention, in which the light flux controlling member is disposed so that the central axis thereof coincides with the optical axis of the light emitting element.

A surface light source device according to the present invention includes the light emitting device according to the present invention and a light diffusion member that transmits light from the light emitting device while diffusing the light.

A display device according to the present invention includes the surface light source device according to the present invention and a display member to be illuminated with light emitted from the surface light source device.

Advantageous Effects of Invention

The light flux controlling member and the light emitting device according to the present invention are capable of achieving high uniformity on a light diffusion member without being affected by the distance between the light flux controlling member and the light diffusion member. Therefore, the surface light source device and the display device according to the present invention can reduce the luminance unevenness as compared with conventional devices.

DESCRIPTION OF EMBODIMENTS

Hereinafter, embodiments of the present invention will be described in detail with reference to the drawings. In the following description, a surface light source device suitable for a backlight of a liquid crystal display device or the like will be described as a typical example of the surface light source device according to the present invention.

Embodiment 1

(Configurations of Surface Light Source Device and Light Emitting Device)

Figure 1A:
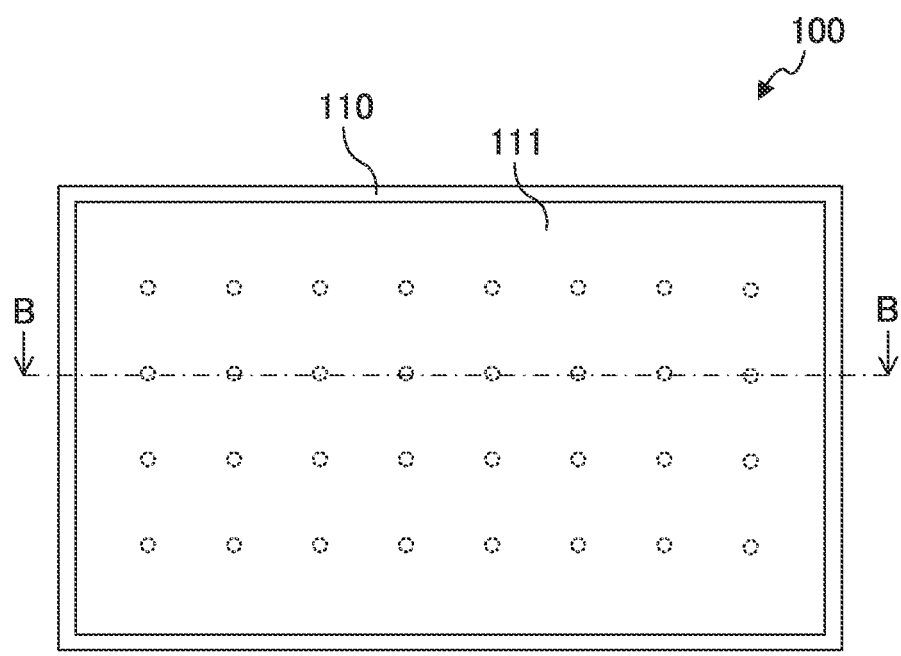
FIGS. 1A and 1B illustrate a configuration of a surface light source device according to Embodiment 1.
Figure 1B:
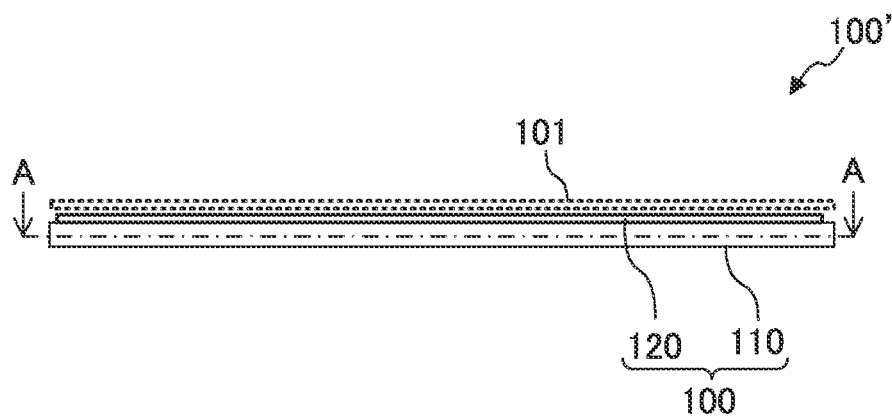
Figure 2A:
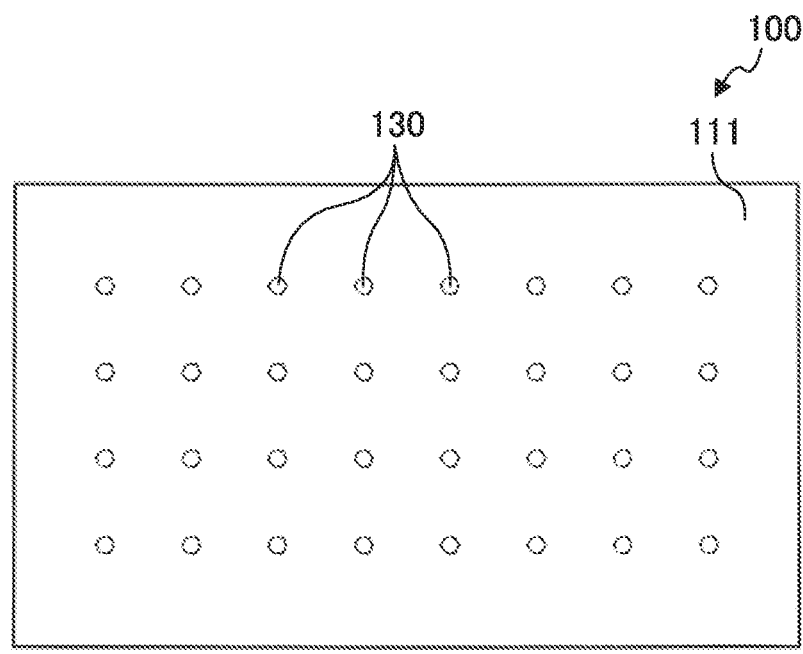
FIGS. 2A and 2B are cross-sectional views illustrating a configuration of the surface light source device according to Embodiment 1.
Figure 2B:
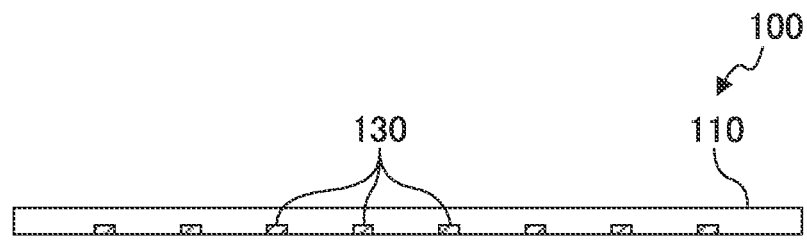
Figure 3:
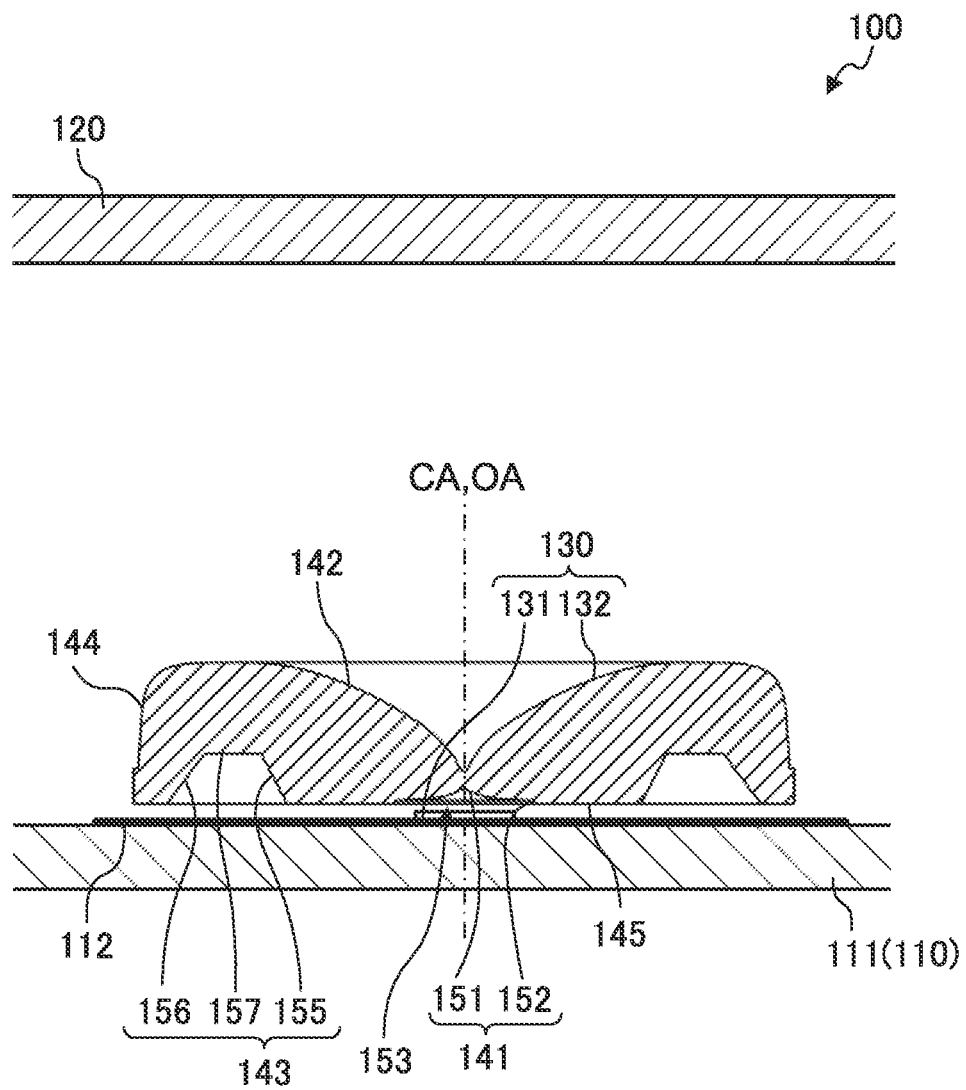
FIG. 3 is a partially enlarged cross-sectional view of a part of FIG. 2B.

FIGS. 1A, 1B, 2A, 2B, and 3 illustrate a configuration of surface light source device 100 according to Embodiment 1. FIG. 1A is a plan view of surface light source device 100 according to Embodiment 1, and FIG. 1B is a front view of the device. FIG. 2A is a cross-sectional view taken along line A-A of FIG. 1B, and FIG. 2B is a cross-sectional view taken along line B-B of FIG. 1A. FIG. 3 is a partially enlarged cross-sectional view of a part of FIG. 2B.

As illustrated in FIGS. 1A, 1B, 2A, 2B, and 3, surface light source device 100 according to Embodiment 1 includes casing 110, light diffusion member 120, and a plurality of light emitting devices 130. The plurality of light emitting devices 130 is disposed in a matrix on bottom plate 111 of casing 110. The inner surface of bottom plate 111 functions as a diffusive reflection surface. As illustrated in FIG. 1B, surface light source device 100 can also be used as display device 100' in combination with a display member 101 (indicated by dotted line in FIG. 1B), such as a liquid crystal panel. The top plate of casing 110 is provided with an opening. Light diffusion member 120 is disposed to cover the opening, and functions as a light emitting surface. The light emitting surface may have any size, such as approximately 400 mm×approximately 700 mm (32 inches). Further, the distance between the light emitting surface (upper surface) of light emitting element 131 and the lower surface of light diffusion member 120 may also be any value.

Light emitting devices 130 are individually fixed to corresponding substrates 112. Each substrate 112 is fixed at a predetermined position on bottom plate 111 of casing 110. Each light emitting device 130 includes light emitting element 131 and light flux controlling member 132.

Light emitting element 131 is a light source of surface light source device 100, and is mounted on substrate 112. Light emitting element 131 is, for example, a light emitting diode (LED) such as a white light emitting diode.

Light flux controlling member 132 is a diffusion lens for controlling the distribution of light emitted from light emitting element 131, and is fixed on substrate 112. Light flux controlling member 132 is disposed over light emitting element 131 so that central axis CA of light flux controlling member 132 coincides with optical axis OA of light emitting element 131. In light flux controlling member 132 as described below, incidence surface 141, reflection surface 142, annular groove 143, and emission surface 144 are all rotationally symmetric (circular symmetric), and their rotation axes coincide with each other. The rotation axes of incidence surface 141, reflection surface 142, annular groove 143, and emission surface 144 are each referred to as "central axis CA of a light flux controlling member." In addition, "optical axis OA of a light emitting element" means a central light beam of a stereoscopic emission light flux from light emitting element 131. A gap is formed between substrate 112 with light emitting element 131 mounted thereon and incidence surface 141 of light flux controlling member 132 to release the heat generated from light emitting element 131 to the outside.

Light flux controlling member 132 is formed by integral molding. The material of light flux controlling member 132 may be any material through which light having a desired wavelength can pass. The material of light flux controlling member 132 is, for example, an optically transparent resin such as polymethylmethacrylate (PMMA), polycarbonate (PC), or an epoxy resin (EP), or glass. The details of light flux controlling member 132 will be described below.

Light diffusion member 120 is a plate-shaped member having a light diffusing property, and allows the light emitted from light emitting device 200 to pass therethrough while diffusing the light. Normally, the size of light diffusion member 120 is substantially the same as that of the member to be irradiated, such as a liquid crystal panel. For example, light diffusion member 120 is formed of an optically transparent resin such as polymethylmethacrylate (PMMA), polycarbonate (PC), polystyrene (PS), or styrene methyl methacrylate copolymerization resin (MS). For providing a light diffusing property, minute irregularities are formed on the surface of light diffusion member 120, or light diffusing members such as beads are dispersed inside light diffusion member 120.

In surface light source device 100 according to the present embodiment, light emitted from each light emitting element 131 is expanded by each corresponding light flux controlling member 132 so as to illuminate a wide range of light diffusion member 120. A part of the light emitted from light emitting element 131 is reflected by substrate 112 and reaches light diffusion member 120. The light emitted from each light flux controlling member 132 is further diffused by light diffusion member 120. Surface light source device 100 according to the present embodiment can thus uniformly illuminate a planar member to be irradiated (e.g., a liquid crystal panel).

(Configuration of Light Flux Controlling Member)

Figure 4:
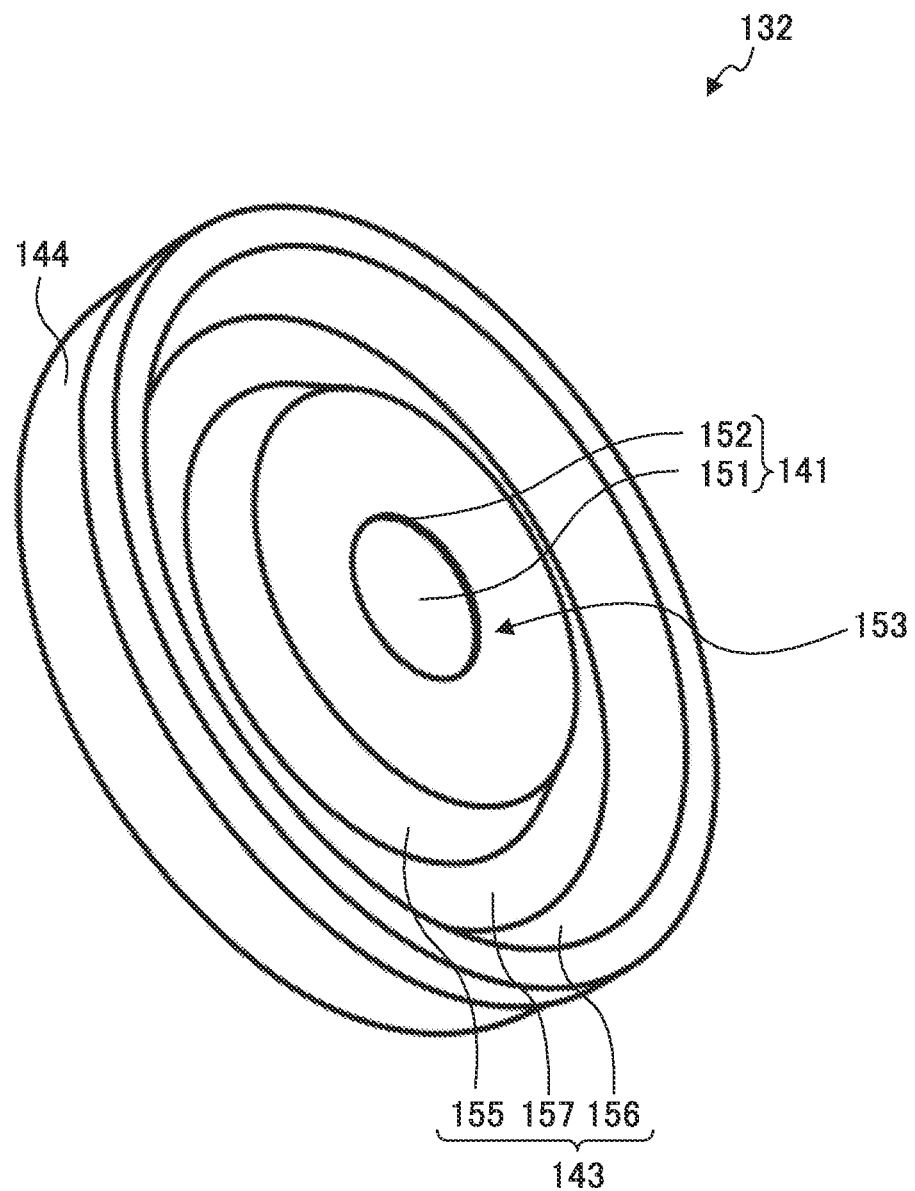
FIG. 4 is a perspective view of the light flux controlling member according to Embodiment 1 as viewed from the back side thereof.
Figure 5A:
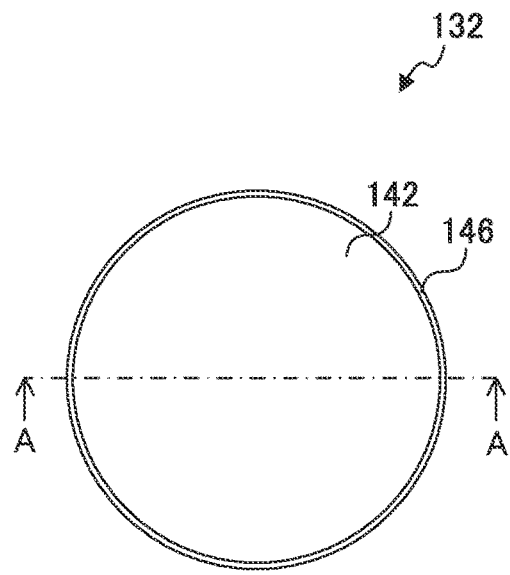
FIGS. 5A to 5D illustrate a configuration of a light flux controlling member according to Embodiment 1.
Figure 5B:
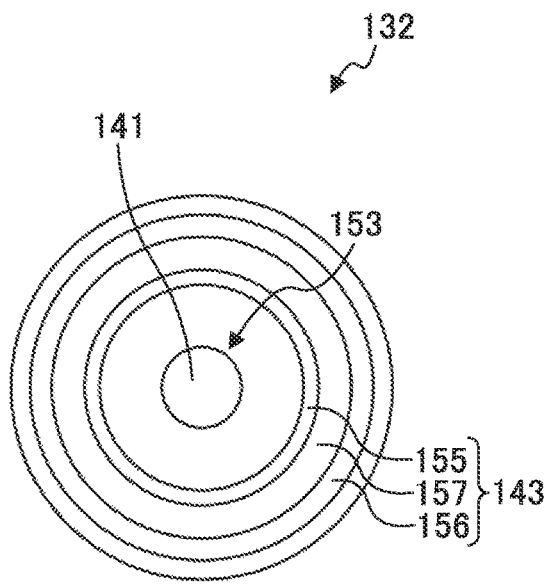
Figure 5C:
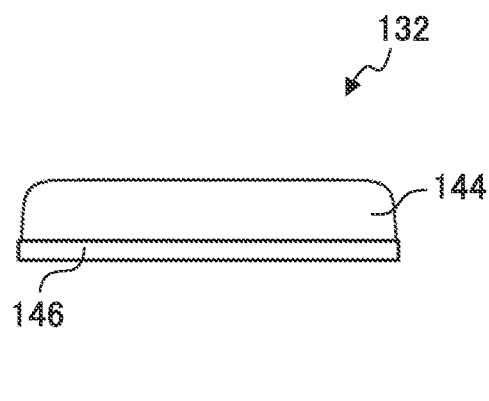
Figure 5D:
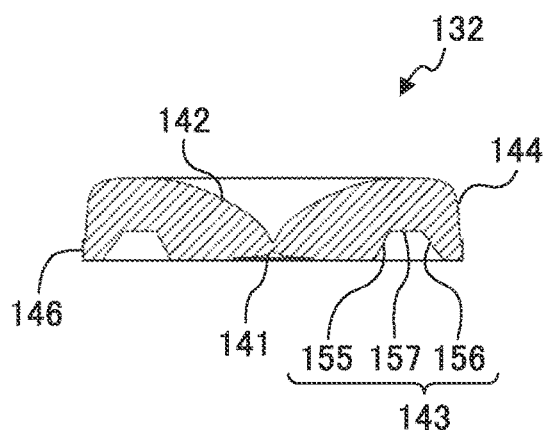
Figure 6:
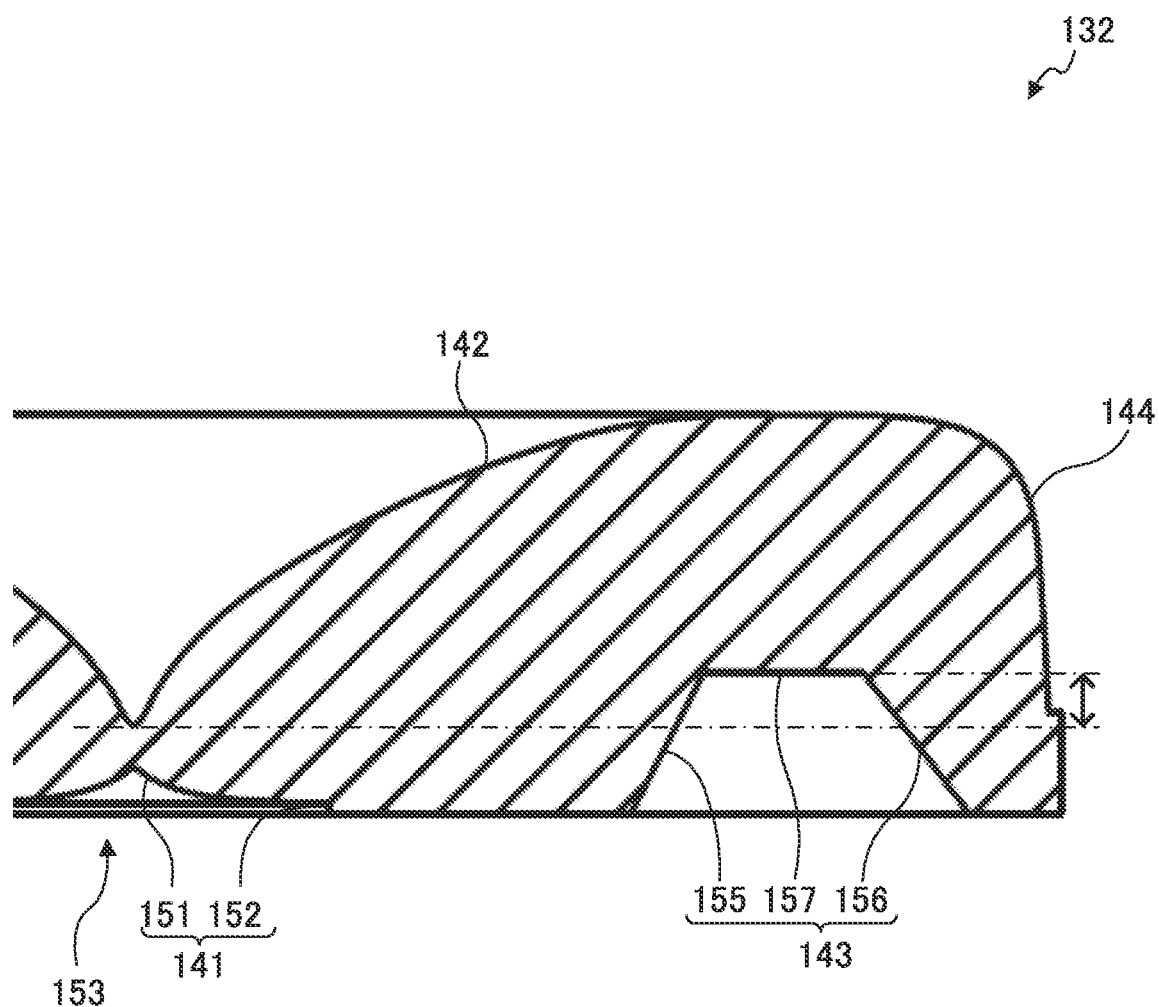
FIG. 6 is a partially enlarged cross-sectional view of a part of FIG. 5D.

FIGS. 4, 5A to 5D, and 6 illustrate a configuration of light flux controlling member 132 according to Embodiment 1. FIG. 4 is a perspective view of light flux controlling member 132 according to Embodiment 1 as viewed from the back side thereof. FIG. 5A is a plan view of light flux controlling member 132 according to Embodiment 1, FIG. 5B is a bottom view of the member, FIG. 5C is a side view of the member, and FIG. 5D is a cross-sectional view taken along line A-A of FIG. 5A. FIG. 6 is a partially enlarged cross-sectional view of FIG. 5D.

As illustrated in FIGS. 4, 5A to 5D, and 6, light flux controlling member 132 includes incidence surface 141, reflection surface 142, annular groove 143, and emission surface 144.

Incidence surface 141 is disposed on the back (light emitting element 131) side of light flux controlling member 132, and is an optical surface for allowing light emitted from light emitting element 131 to enter the inside of light flux controlling member 132. Incidence surface 141 is disposed so as to intersect central axis CA of light flux controlling member 132, and refracts the incident light toward reflection surface 142. Incidence surface 141 may have any shape that can exhibits the above function. Incidence surface 141 may be an inner surface of recess 153 that opens on the back side, or may be a flat surface. In the present embodiment, incidence surface 141 is an inner surface of recess 153 that opens on the back side.

Incidence surface 141 includes first incidence surface 151 and second incidence surface 152. First incidence surface 151 is disposed on the bottom side of recess 153 so as to intersect central axis CA. Of the light emitted from light emitting element 131, first incidence surface 151 allows light having a small emission angle to enter the inside of light flux controlling member 132. First incidence surface 151 may be composed of one surface or a plurality of surfaces. In the present embodiment, first incidence surface 151 is composed of one curved surface. First incidence surface 151 is rotationally symmetric (circular symmetric) about central axis CA as the rotation axis. In a cross section including central axis CA, first incidence surface 151 is formed so that the distance of the surface from the opening edge of recess 153 decreases as the distance of the surface from central axis CA increases.

Second incidence surface 152 is disposed on the opening side of recess 153 so as to connect the outer edge of first incidence surface 151 and the opening edge of recess 153. Second incidence surface 152 allows light having an emission angle larger than that of the light incident on first incidence surface 151 to enter the inside of light flux controlling member 132. Second incidence surface 152 is rotationally symmetric (circular symmetric) about central axis CA as the rotation axis. In a cross section including central axis CA, second incidence surface 152 is disposed so as to be parallel to central axis CA.

Reflection surface 142 is disposed on the side opposite to incidence surface 141, and is an optical surface for reflecting the light incident on incidence surface 141 toward the side (reflecting laterally). Reflection surface 142 is a rotationally symmetric (circular symmetric) surface about central axis CA of light flux controlling member 132. The generatrix from the central portion to the outer peripheral portion of this rotationally symmetric surface is a concave curve with respect to light emitting element 131, and reflection surface 142 is a curved surface in a state where the generatrix is rotated by 360° about central axis CA as the rotation axis. That is, reflection surface 142 includes an aspherical curved surface whose height from light emitting element 131 increases as the distance of the surface from central axis CA increases. The outer peripheral portion of reflection surface 142 is formed to be disposed closer to the front side than the portion of reflection surface 142 intersecting central axis CA is. For example, reflection surface 142 is an aspherical curved surface whose height from light emitting element 131 increases from the central portion toward the outer peripheral portion of reflection surface 142. The inclination angle of reflection surface 142 relative to the planar direction of substrate 112 decreases from the central portion toward the outer peripheral portion in reflection surface 142.

Annular groove 143 is located farther from central axis CA than incidence surface 141 is, and is disposed on the back side so as to surround central axis CA. In the present embodiment, annular groove 143 is disposed so as not to intersect the optical path of light emitted from the light emitting center of light emitting element 131, incident on incidence surface 141, reflected by reflection surface 142, and reaching emission surface 144. In the present embodiment, annular groove 143 is designed in such a way that light emitted from the light emitting center of the light emitting element, incident on incidence surface 141, and reflected by reflection surface 142 does not reach first annular surface 155. Annular groove 143 includes first annular surface 155, second annular surface 156, and third annular surface 157. In a cross section including central axis CA, annular groove 143 may have any shape that can exhibits the above function. In the cross section including central axis CA, annular groove 143 has a shape of a trapezoid in the present embodiment. That is, first annular surface 155 and second annular surface 156 correspond to the legs of the trapezoid, and third annular surface 157 corresponds to the upper base (lower base) of the trapezoid.

The depth of annular groove 143 may be constant or changed in the circumferential direction with central axis CA as the rotation axis. In the present embodiment, the depth of annular groove 143 is constant in the circumferential direction with central axis CA as the rotation axis. The width of annular groove 143 may be constant or changed in the circumferential direction with central axis CA as the rotation axis. In the present embodiment, the width of annular groove 143 is constant in the circumferential direction with central axis CA as the rotation axis. That is, annular groove 143 is rotationally symmetric about central axis CA in the present embodiment. The bottom part of annular groove 143 is preferably disposed closer to the front side than the central portion of reflection surface 142 is (see the double-headed arrow line shown in FIG. 6). The bottom part of annular groove 143 means "the deepest position in annular groove 143 from the opening."

First annular surface 155 is disposed on the central axis CA side so as to surround central axis CA. First annular surface 155 is an inclining surface whose height from light emitting element 131 increases as the distance of the surface from central axis CA increases in a cross section including central axis CA. First annular surface 155 refracts light, which is emitted from the light emitting center of light emitting element 131, is incident on incidence surface 141, and then directly reaches first annular surface 155, toward the front side. The inclination direction of first annular surface 155 with respect to central axis CA has an angle such that light incident on second incidence surface 152 is not totally reflected and light incident on the back surface is not reflected in the direction toward central axis CA. First annular surface 155 may have any shape in a cross section including central axis CA. In the cross section including central axis CA, first annular surface 155 has a shape of a straight or curved line. Examples of the curved line include an arc whose center of curvature is outside the arc and an arc whose center of curvature is inside the arc. In the cross section including central axis CA, first annular surface 155 has a shape of a straight line in the present embodiment. That is, first annular surface 155 may have a shape of a side surface of an inverted truncated cone. Such a shape enables light flux controlling member 132 to be readily removed from a mold when light flux controlling member 132 is injection molded.

Second annular surface 156 is located farther from central axis CA than first annular surface 155 is, separated from first annular surface 155, and disposed so as to surround central axis CA. Second annular surface 156 is an inclining surface whose height from light emitting element 131 increases as the distance of the surface from central axis CA decreases in a cross section including central axis CA. Second annular surface 156 refracts light, which is emitted from light emitting element 131 and directly reaches second annular surface 156, toward the front side. Second annular surface 156 may have any shape in a cross section including central axis CA. In the cross section including central axis CA, second annular surface 156 has a shape of a straight or curved line. Examples of the curved line include an arc whose center of curvature is outside the arc and an arc whose center of curvature is inside the arc. In the cross section including central axis CA, second annular surface 156 has a shape of a straight line in the present embodiment. That is, second annular surface 156 has a shape of a side surface of a truncated cone.

Third annular surface 157 links first annular surface 155 and second annular surface 156 to each other. Third annular surface 157 may have any shape that can exhibits the above function. Third annular surface 157 may be one flat surface, a plurality of flat surfaces, or at least one curved surface. In the present embodiment, third annular surface 157 has a shape of one flat surface. In a cross section including central axis CA, the distance of the inner end of third annular surface 157 from back surface 145 may be the same as or different from the distance of the outer end of third annular surface 157 from back surface 145. In the cross section including central axis CA, the distance of the inner end of third annular surface 157 from back surface 145 is the same as the distance of the outer end of third annular surface 157 from back surface 145 in the present embodiment. Third annular surface 157 is preferably disposed so that the light emitted from light emitting element 131 does not directly reach the surface.

Emission surface 144 emits the light reflected by reflection surface 142 to the outside of light flux controlling member 132. Emission surface 144 is disposed so as to surround central axis CA. The inner end of emission surface 144 is connected to reflection surface 142, and the outer end of emission surface 144 is connected to flange 146. In the present embodiment, emission surface 144 is smoothly connected to reflection surface 142.

Back surface 145 is disposed between recess 153 and annular groove 143. In the present embodiment, back surface 145 is a flat surface located on the back side of light flux controlling member 132 and extends in the radial direction from the opening edge of recess 153.

Although not particularly illustrated, light flux controlling member 132 includes a plurality of legs. The plurality of legs is a portion for positioning light flux controlling member 132 with respect to substrate 112. For example, three legs are disposed on back surface 145.

(Simulation)

A simulation is performed for the optical path of light in light emitting devices. This simulation is performed for light emitting device 130 including light flux controlling member 132 according to Embodiment 1, and light flux controlling members 232 and 332 according to corresponding comparative examples 1 and 2 which include annular grooves having different shapes. First, the configurations of light flux controlling members 232 and 332 according to comparative examples 1 and 2 will be described. Light flux controlling member 232 according to comparative example 1 and light flux controlling member 332 according to comparative example 2 differ from light flux controlling member 132 according to the present embodiment only in the configurations of the annular grooves, and thus components the same as in the present embodiment are designated by the same reference numerals and the description thereof will be omitted.

Figure 7A:
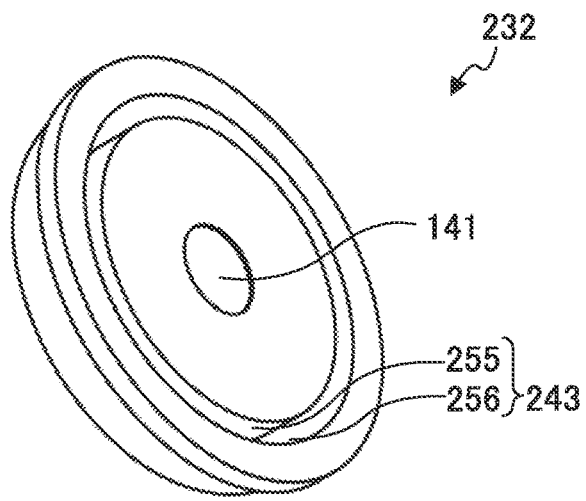
FIGS. 7A to 7C illustrate a configuration of a light flux controlling member according to comparative example 1.
Figure 7B:
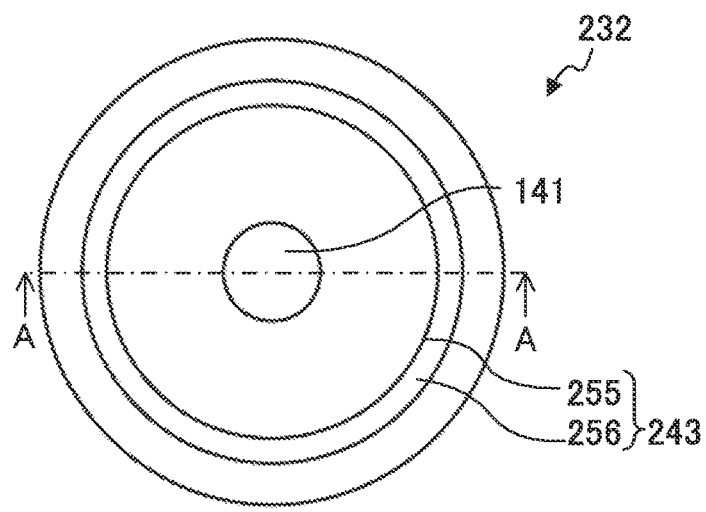
Figure 7C:
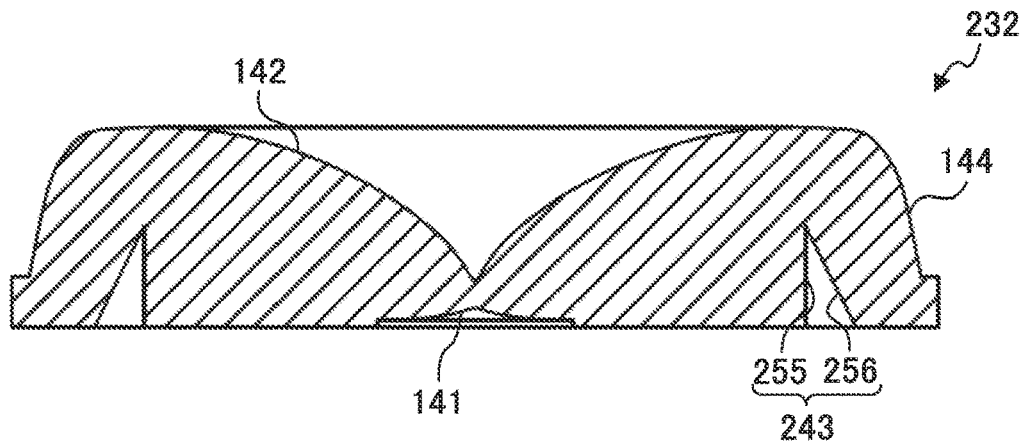
Figure 8A:
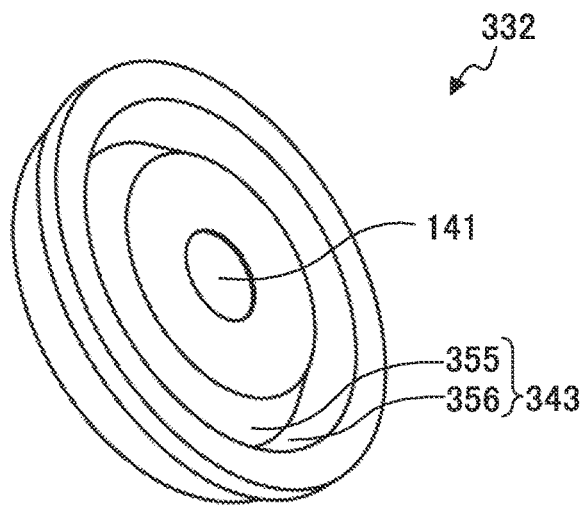
FIGS. 8A to 8C illustrate a configuration of a light flux controlling member according to comparative example 2.
Figure 8B:
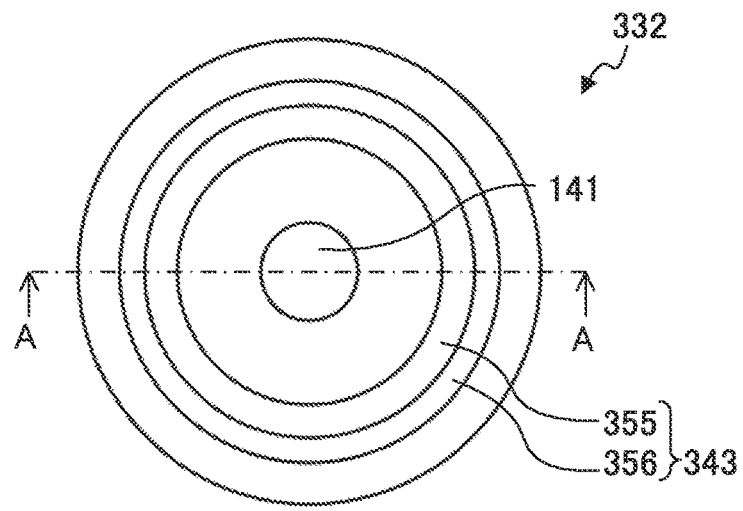
Figure 8C:
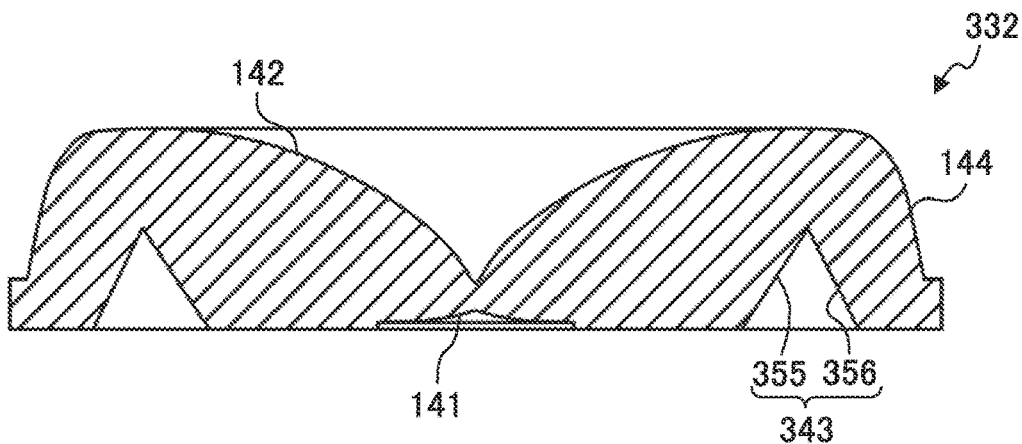

FIGS. 7A to 7C illustrate a configuration of light flux controlling member 232 according to comparative example 1. FIG. 7A is a perspective view of light flux controlling member 232 according to comparative example 1 as viewed from the back side thereof, FIG. 7B is a bottom view of the member, and FIG. 7C is a cross-sectional view taken along line A-A of FIG. 7B. FIGS. 8A to 8C illustrate a configuration of light flux controlling member 332 according to comparative example 2. FIG. 8A is a perspective view of light flux controlling member 332 according to comparative example 2 as viewed from the back side thereof, FIG. 8B is a bottom view of the member, and FIG. 8C is a cross-sectional view taken along line A-A of FIG. 8B. The illustration of legs is omitted in FIGS. 7A to 7C and 8A to 8C.

As illustrated in FIGS. 7A to 7C, light flux controlling member 232 according to comparative example 1 includes incidence surface 141, reflection surface 142, annular groove 243, and emission surface 144. Annular groove 243 of light flux controlling member 232 according to comparative example 1 includes first annular surface 255 and second annular surface 256. That is, annular groove 243 of light flux controlling member 232 according to comparative example 1 does not include third annular surface 157. In comparative example 1, annular groove 243 has a shape of a triangle in a cross section including central axis CA. In comparative example 1, first annular surface 255 is disposed along central axis CA in the cross section including central axis CA. In comparative example 1, second annular surface 256 is disposed so that the distance of the surface from the back side decreases, from the central axis CA side (central portion) toward the outer peripheral portion, in the cross section including central axis CA. The depth of annular groove 243 in modification 1 is larger than the depth of annular groove 143 in Embodiment 1.

As illustrated in FIGS. 8A to 8C, light flux controlling member 332 according to comparative example 2 includes incidence surface 141, reflection surface 142, annular groove 343, and emission surface 144. Annular groove 343 of light flux controlling member 332 according to comparative example 2 includes first annular surface 355 and second annular surface 356. That is, annular groove 343 of light flux controlling member 332 according to comparative example 2 does not include third annular surface 157. In comparative example 2, annular groove 343 has a shape of a triangle in a cross section including central axis CA. In comparative example 2, first annular surface 355 is disposed so that the distance of the surface from the front side decreases, from the central axis CA side (central portion) toward the outer peripheral portion, in the cross section including central axis CA. Second annular surface 356 is disposed so that the distance of the surface from the back side decreases, from the central axis CA side (central portion) toward the outer peripheral portion, in the cross section including central axis CA. The depth of annular groove 243 in comparative example 2 is larger than the depth of annular groove 143 in Embodiment 1.

Figure 9A:
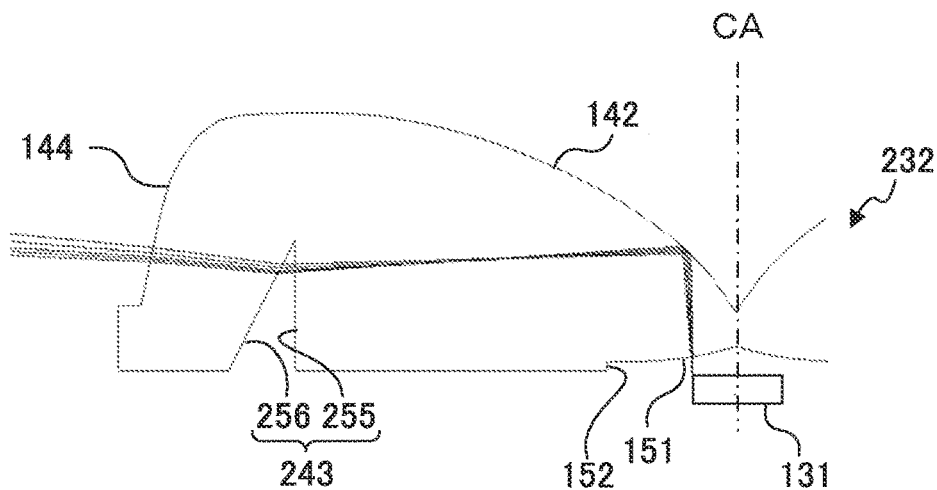
FIGS. 9A to 9C illustrate the simulation results of optical paths in the light flux controlling members according to comparative examples 1 and 2.
Figure 9B:
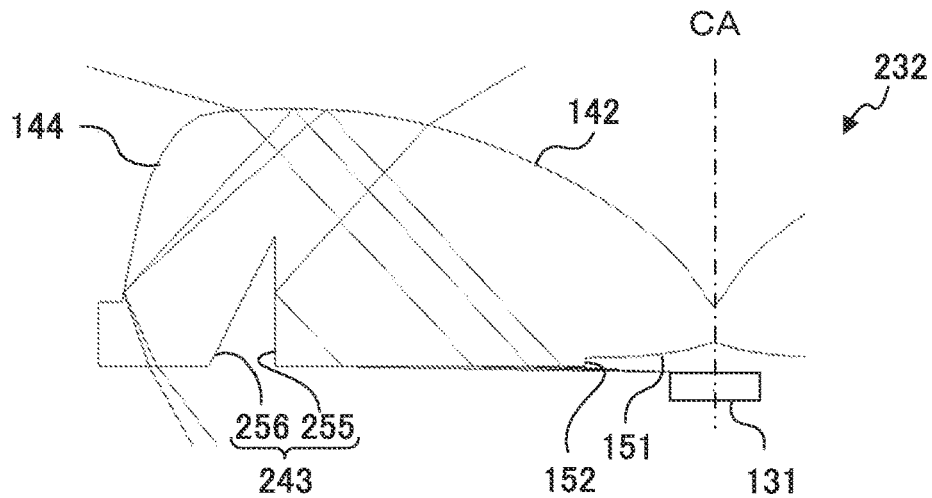
Figure 9C:
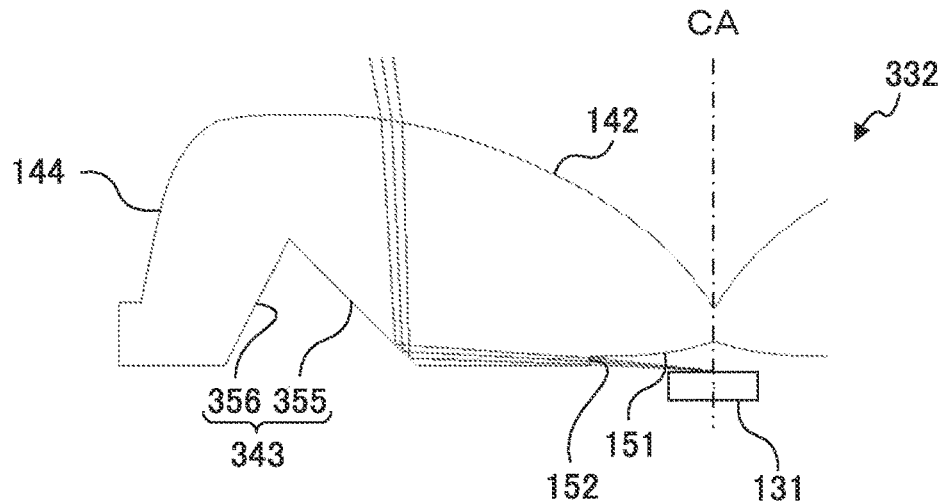

Optical paths of light in light flux controlling member 132 according to Embodiment 1, light flux controlling member 232 according to comparative example 1, and light flux controlling member 332 according to comparative example 2 will then be described. FIGS. 9A and 9B illustrate optical paths of light in light flux controlling member 232 according to comparative example 1. FIG. 9C illustrates optical paths of light in light flux controlling member 332 according to comparative example 2.

As illustrated in FIG. 9A, a part of the light having a small emission angle emitted from a portion of light emitting element 131 other than its center is incident on first incidence surface 151 and refracted toward reflection surface 142 in light flux controlling member 232 according to comparative example 1. The light entering light flux controlling member 232 is reflected toward the side of the light entering light flux controlling member by reflection surface 142. A part of the light reflected by reflection surface 142 (light reflected at a region close to emission surface 144 in reflection surface 142) is emitted from emission surface 144 to the outside of light flux controlling member 232. Another part of the light reflected by reflection surface 142 (light reflected at a region close to central axis CA in reflection surface 142) is emitted from first annular groove 255 to the outside of light flux controlling member 232. First annular surface 255 is parallel to central axis CA, and thus the light emitted from first annular surface 255 is not largely refracted. The light emitted from first annular surface 255 then enters the inside of light flux controlling member 232 from second annular surface 256. Second annular surface 256 is disposed so that the distance of the surface from the back side decreases, from the central portion toward the outer peripheral portion, and thus the light incident on second annular surface 256 is refracted toward the front side. Accordingly, a part of the light reflected by reflection surface 142 is refracted toward the front side by first annular surface 255 and second annular surface 256. The light refracted toward the front side is then emitted from emission surface 144 to the outside of light flux controlling member 232.

As illustrated in FIG. 9B, a part of the light having a large emission angle emitted from a portion of the light emitting element other than its center is incident on back surface 145 and refracted toward the reflection surface 142 side. A part of the light refracted toward the reflection surface 142 side reaches reflection surface 142. A part of the light having reached reflection surface 142 is internally reflected toward emission surface 144, internally reflected again by emission surface 144, and emitted from back surface 145. Another part of the light having reached reflection surface 142 is emitted to the outside from reflection surface 142. Another part of the light incident on back surface 145 is internally reflected by first annular surface 255 and then emitted from reflection surface 142 toward the central axis CA side.

In light flux controlling member 332 according to comparative example 2, light having a large emission angle emitted from the center of light emitting element 131 enters the inside of light flux controlling member 332 from second incidence surface 152 as illustrated in FIG. 9C. The light having entered light flux controlling member 332 reaches first annular surface 355. All the light having reached first annular surface 355 is internally reflected (totally reflected) toward reflection surface 142. The internally reflected light reaches reflection surface 142. The light having reached reflection surface 142 is emitted to the outside from reflection surface 142.

Figure 10A:
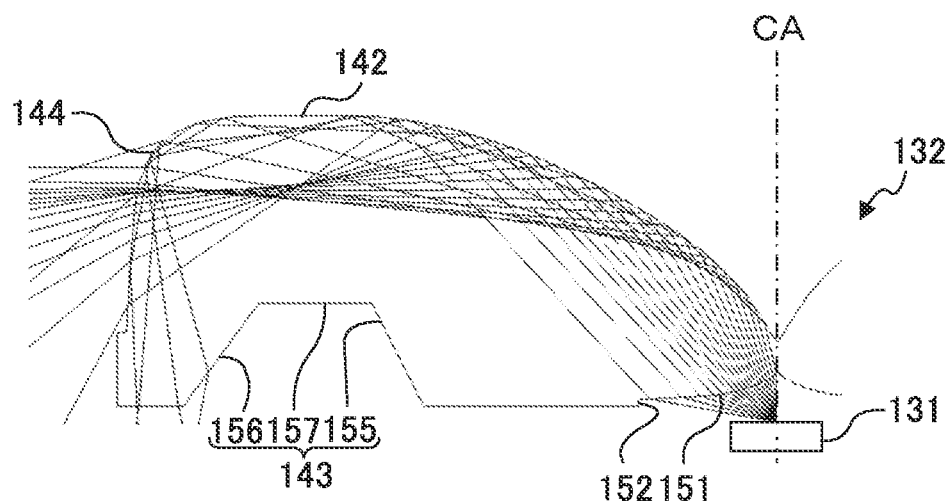
FIGS. 10A to 10C illustrate the simulation results of optical paths in the light flux controlling member according to Embodiment 1.

In light flux controlling member 132 according to the present embodiment, light which has a small emission angle and is emitted from the light emitting center of light emitting element 131 enters the inside of light flux controlling member 132 from first incidence surface 151 as illustrated in FIG. 10A. The light having entered the inside of light flux controlling member 132 is refracted toward reflection surface 142. The light having reached reflection surface 142 is reflected toward the side of the light flux controlling member. The light reflected by reflection surface 142 is emitted from emission surface 144 in the direction orthogonal to central axis CA or in a direction tilting toward the back side compared to the direction orthogonal to central axis CA.

Figure 10B:
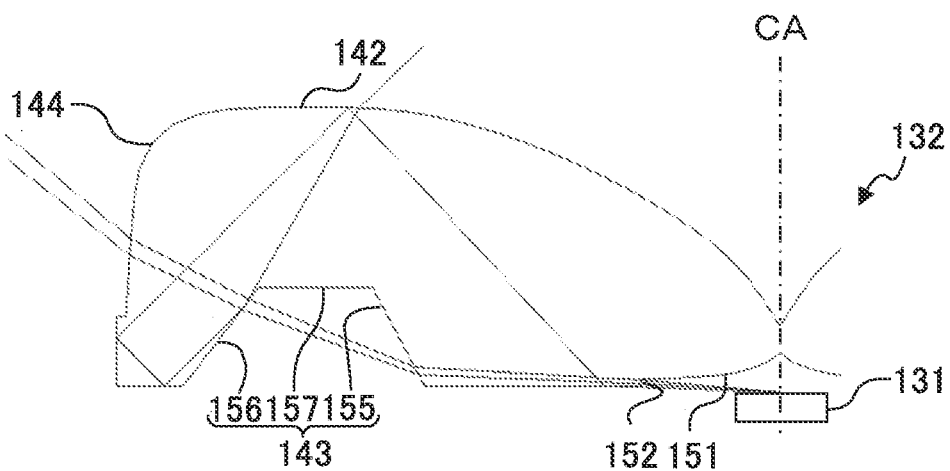

In light flux controlling member 132 according to the present embodiment, light which has a large emission angle and is emitted from the light emitting center of light emitting element 131 enters the inside of light flux controlling member 132 from second incidence surface 152 as illustrated in FIG. 10B. The light incident on second incidence surface 152 is emitted from first annular surface 155 to the outside of light flux controlling member 132. In comparative example 2, the light incident on second incidence surface 152 is totally reflected. First annular surface 155 is inclined with respect to central axis CA in the present embodiment, and thus the light emitted from first annular surface 155 is refracted toward the front side. In addition, the light emitted from first annular surface 155 enters the inside of light flux controlling member 132 from second annular surface 156. In the present embodiment, second annular surface 156 is disposed so that the distance of the surface from the back side decreases, from the central portion toward the outer peripheral portion, and thus the light incident on second annular surface 156 is substantially not refracted. The light incident on second annular surface 156 is emitted to the outside without being substantially refracted.

Figure 10C:
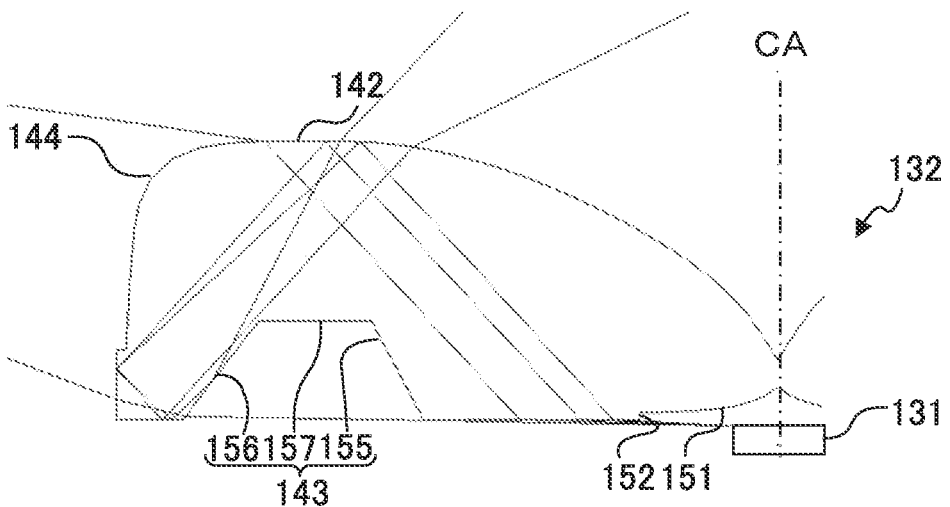

In light flux controlling member 132 according to the present embodiment, light which has a larger emission angle and is emitted from a portion of light emitting element 131 other than its light emission center enters the inside of light flux controlling member 132 from back surface 145 as illustrated in FIG. 10C. The light incident on back surface 145 is refracted toward reflection surface 142. The light incident on back surface 145 is internally reflected by reflection surface 142, flange 146, and second annular surface 156, and is emitted from reflection surface 142 toward a part directly above light flux controlling member 132.

Figure 11:
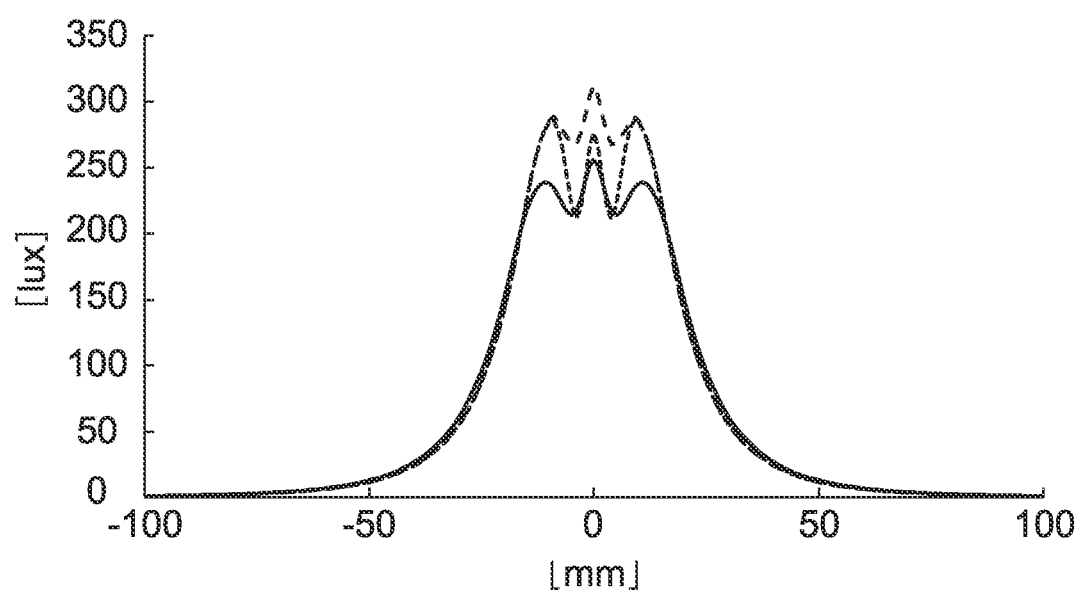
FIG. 11 is a graph showing the simulation results of the illuminance distribution when the light flux controlling members in Embodiment 1, comparative example 1, and comparative example 2 are used.

FIG. 11 is a graph of the simulation results of the illuminance distribution on light diffusion members 120 when the light flux controlling members in the present embodiment, comparative example 1, and comparative example 2 are used. In FIG. 11, the solid line represents the illuminance when light flux controlling member 132 according to the present invention is used, the long broken line represents the illuminance when light flux controlling member 232 according to comparative example 1 is used, and the short broken line represents the illuminance when light flux controlling member 332 according to comparative example 2 is used. The abscissa of FIG. 11 indicates the distance (mm) from the intersection of optical axis OA and the diffusion plate, and the ordinate of FIG. 11 indicates the illuminance (lux).

As shown in FIG. 11, the luminance of the parts directly above the light flux controlling members decreases in the order of light flux controlling member 232 according to comparative example 1, light flux controlling member 332 according to comparative example 2, and light flux controlling member 132 according to the present embodiment. FIG. 11 also shows that the illuminance distribution on light diffusion members 120 becomes wider in the order of light flux controlling member 232 according to comparative example 1, light flux controlling member 332 according to comparative example 2, and light flux controlling member 132 according to the present embodiment.

(Effect) In light flux controlling member 132 according to Embodiment 1, annular groove 143 is not formed on the optical path of the light reflected by reflection surface 142 as described above, and thus the light reflected by reflection surface 142 is emitted in the direction orthogonal to central axis CA or in a direction tilting toward the back side compared to the direction orthogonal to central axis CA. The waveform of the illuminance distribution in surface light source device 100 according to the present embodiment thus can be improved. Making the shape of annular groove 143 trapezoidal in a cross section including central axis CA enables the reduction of the manufacturing cost as the volume of a portion to be removed increases.

[Modifications 1 to 4 of Embodiment 1]

Surface light source devices according to modifications 1 to 4 of Embodiment 1 differ from surface light source device 100 according to Embodiment 1 only in the configurations of their light flux controlling members. Light flux controlling members 532, 632, 732, and 832 according to modifications 1 to 4 will thus only be described.

Figure 12A:
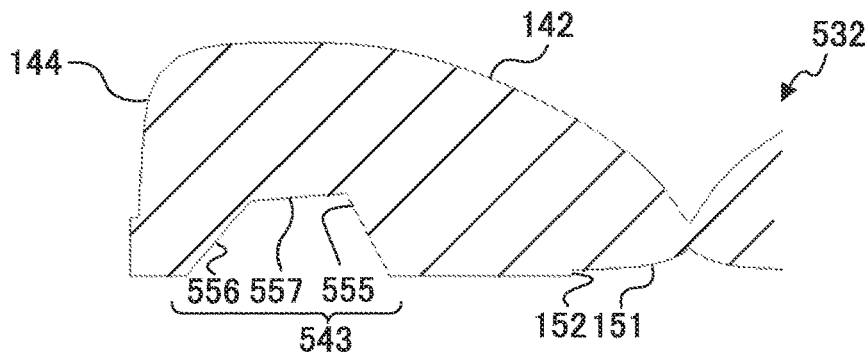
FIGS. 12A to 12D are partially enlarged cross-sectional views of light flux controlling members according to modifications 1 to 4.
Figure 12B:
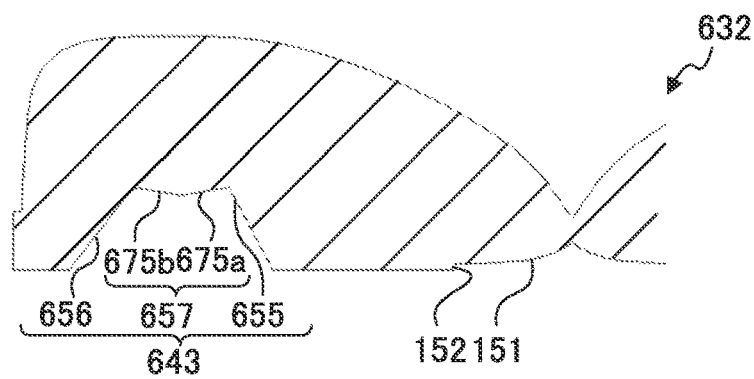
Figure 12C:
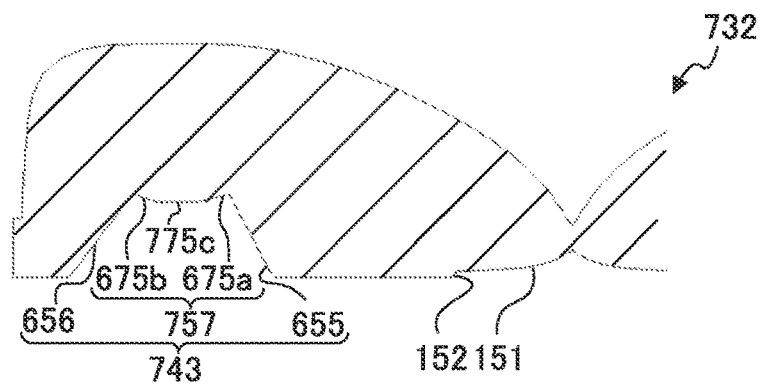
Figure 12D:
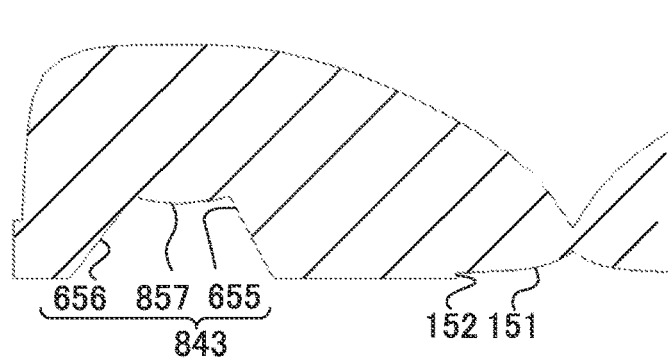

FIGS. 12A to 12D are partially enlarged cross-sectional views of light flux controlling members 532, 632, 732, and 832 according to modifications 1 to 4. FIG. 12A is a partially enlarged cross-sectional view of light flux controlling member 532 according to modification 1, FIG. 12B is a partially enlarged cross-sectional view of light flux controlling member 632 according to modification 2, FIG. 12C is a partially enlarged cross-sectional view of light flux controlling member 732 according to modification 3, and FIG. 12D is a partially enlarged cross-sectional view of light flux controlling member 832 according to modification 4.

As illustrated in FIG. 12A, annular groove 543 in light flux controlling member 532 according to modification 1 includes first annular surface 555, second annular surface 556, and third annular surface 557. In the present modification, the inclination angle of first annular surface 555 with respect to central axis CA is smaller than the inclination angle of second annular surface 556 with respect to central axis CA. In addition, in a cross section including central axis CA, the length of the upper end portion of first annular surface 555 in the central axis CA direction is longer than the length of the upper end portion of second annular surface 556 in the central axis CA direction. That is, third annular surface 557 in light flux controlling member 532 according to the present modification is disposed so that the distance of the surface from back surface 145 decreases as the distance of the surface from the center increases.

As illustrated in FIG. 12B, annular groove 643 in light flux controlling member 632 according to modification 2 includes first annular surface 655, second annular surface 656, and third annular surface 657. In the present modification, third annular surface 657 includes first individual annular surface 675a and second individual annular surface 675b. In a cross section including central axis CA, first individual annular surface 675a and second individual annular surface 675b may each have a shape of a straight or curved line. First individual annular surface 675a and second individual annular surface 675b are curved surfaces in the present modification. First individual annular surface 675a is formed so that the distance of the surface from back surface 145 decreases, from the center toward the outer peripheral portion. Second individual annular surface 675b is formed so that the distance of the surface from back surface 145 increases, from the center toward the outer peripheral portion.

As illustrated in FIG. 12C, annular groove 743 in light flux controlling member 732 according to modification 3 includes first annular surface 655, second annular surface 656, and third annular surface 757. In the present modification, third annular surface 757 includes first individual annular surface 675a, second individual annular surface 675b, and third individual annular surface 775c. As first individual annular surface 675a and second individual annular surface 675b are the same as those of modification 2, the description thereof will be omitted. Third individual annular surface 775c links first individual annular surface 675a and second individual annular surface 675b to each other. Third individual annular surface 775c is disposed so as to be parallel to back surface 145 in the present modification.

As illustrated in FIG. 12D, annular groove 843 in light flux controlling member 832 according to modification 4 includes first annular surface 655, second annular surface 656, and third annular surface 857. Third annular surface 857 is a curved surface protruding toward the back surface 145 side in the present modification.

In modifications 1 to 4, each of first annular surfaces 555 and 655 is an inclining surface whose height from light emitting element 131 increases as the distance of the surface from central axis CA increases in a cross section including central axis CA, and the first annular surface refracts light, which is emitted from the light emitting center of light emitting element 131, is incident on incidence surface 141, and then directly reaches first annular surface 555 or 655, toward the front side. In addition, each of second annular surfaces 556 and 656 is an inclining surface whose height from light emitting element 131 increases as the distance of the surface from central axis CA decreases in the cross section including central axis CA, and the second annular surface refracts light, which is emitted from light emitting element 131 and directly reaches second annular surface 556 or 656, toward the front side.

Embodiment 2

Figure 13A:
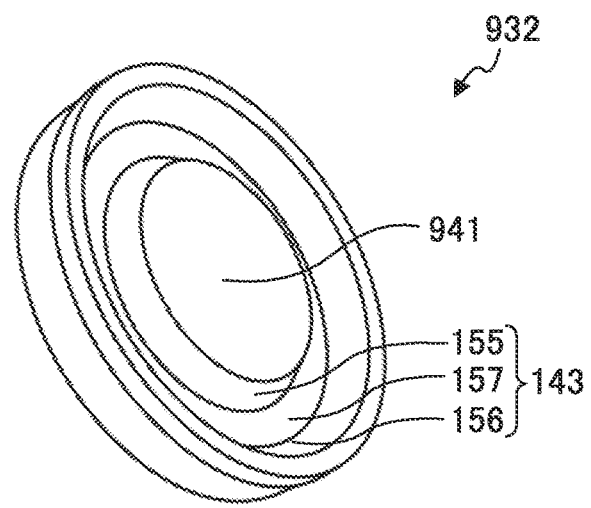
FIGS. 13A to 13C illustrate a configuration of a light flux controlling member according to Embodiment 2.
Figure 13B:
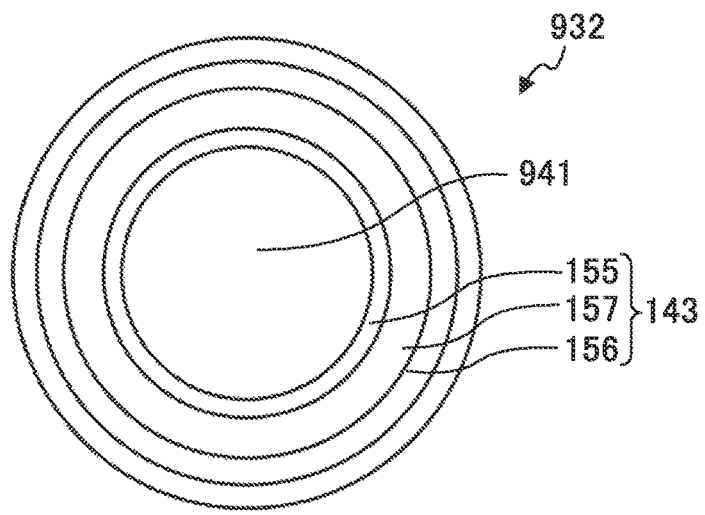
Figure 13C:
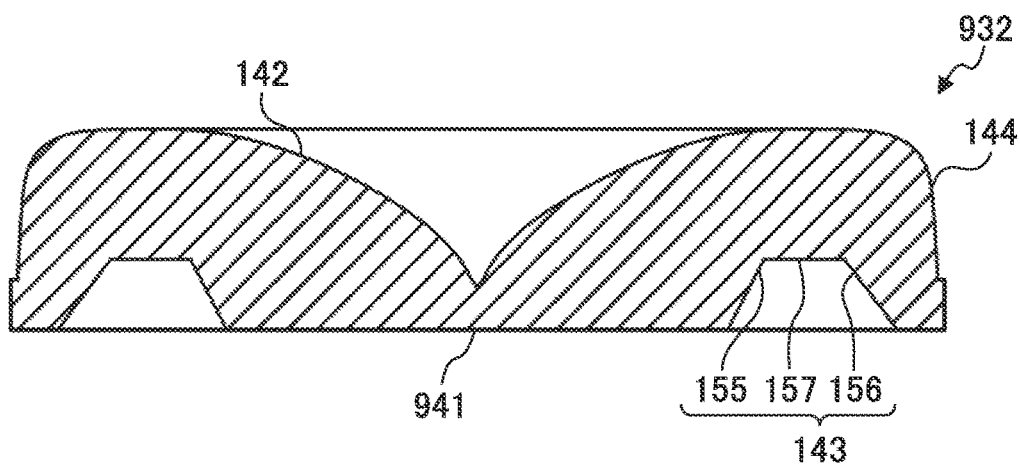

In the following, the configuration of light flux controlling member 932 according to Embodiment 2 will be described. FIGS. 13A to 13C illustrate a configuration of light flux controlling member 932 according to Embodiment 2. FIG. 13A is a perspective view of light flux controlling member 932 according to Embodiment 2 as viewed from the incidence surface 941 side, FIG. 13B is a bottom view of the member, and FIG. 13C is a cross-sectional view including central axis CA.

As illustrated in FIGS. 13A to 13C, light flux controlling member 932 according to Embodiment 2 includes incidence surface 941, reflection surface 142, annular groove 143, and emission surface 144. In the present embodiment, incidence surface 941 is a flat surface.

INDUSTRIAL APPLICABILITY

The light flux controlling member, the light emitting device and the surface light source device according to the present invention may be applied to, for example, a backlight of a liquid crystal display device and general-purpose lighting.

REFERENCE SIGNS LIST

100 Surface light source device
100' Display device
101 Display member
110 Casing
111 Bottom plate
112 Substrate
120 Light diffusion member
130 Light emitting device
131 Light emitting element
132, 232, 332, 532, 632, 732, 832, 932 Light flux controlling member
141, 941 Incidence surface
142 Reflection surface
143, 243, 343, 543, 643, 743, 843 Annular groove
144 Emission surface
145 Back surface
146 Flange
151 First incidence surface
152 Second incidence surface
153 Recess
155, 255, 355, 555, 655 First annular surface
156, 256, 356, 556, 656 Second annular surface
157, 557, 657, 757, 857 Third annular surface
675a First individual annular surface
675b Second individual annular surface
775c Third individual annular surface
CA Central axis
OA Optical axis

The invention claimed is:

1. A light flux controlling member that controls a distribution of light emitted from a light emitting element, the light flux controlling member comprising:
   an incidence surface disposed on a back side so as to intersect a central axis of the light flux controlling member, the incidence surface being for allowing incidence of the light emitted from the light emitting element;
   a reflection surface disposed on a front side so that a height of the reflection surface from the light emitting element increases as a distance of the reflection surface from the central axis increases, the reflection surface being for laterally reflecting the light incident on the incidence surface;
   an annular groove that includes a first annular surface located farther from the central axis than the incidence surface is and disposed on the back side so as to surround the central axis, and a second annular surface located farther from the central axis than the first annular surface is and disposed to be separated from the first annular surface, the first annular surface being disposed on a side of the central axis in the annular groove; and
   an emission surface located farther from the central axis than the annular groove is and disposed so as to surround the central axis, the emission surface being for emitting the light reflected by the reflection surface, wherein
   the incidence surface includes a first incident surface which is an inner surface of a recess formed so as to intersect the central axis, and a second incidence surface disposed between an opening edge of the first incidence surface and the annular groove,
   the annular groove is disposed so as not to intersect an optical path of light emitted from a light emitting center of the light emitting element, incident on the incidence surface, reflected by the reflection surface, and then reaching the emission surface,
   in a cross section including the central axis, the first annular surface is an inclining surface whose height from the light emitting element increases as a distance of the first annular surface from the central axis increases, the first annular surface refracting, toward the front side, light emitted from the light emitting center of the light emitting element, incident on the incidence surface, and then directly reaching the first annular surface, and,
   in the cross section including the central axis, the second annular surface is an inclining surface whose height from the light emitting element increases as a distance of the second annular surface from the central axis decreases, the second annular surface refracting, toward the front side, light emitted from the light emitting element and directly reaching the second annular surface.

2. The light flux controlling member according to claim 1, wherein the light emitted from the light emitting center of the light emitting element, incident on the incidence surface, reflected by the reflection surface, and then directly reaching the emission surface is emitted in a direction orthogonal to the central axis or in a direction tilting toward the back side compared to the direction orthogonal to the central axis.

3. The light flux controlling member according to claim 1, wherein:
the annular groove further includes a third annular surface that links the first annular surface and the second annular surface to each other, and
the third annular surface is disposed so that light emitted from the light emitting element and not incident on the incidence surface does not directly reach the third annular surface.

4. The light flux controlling member according to claim 1, wherein a bottom part of the annular groove is disposed closer to the front side than a portion of the reflection surface is, the portion intersecting the central axis.

5. The light flux controlling member according to claim 1, wherein the annular groove is rotationally symmetric about the central axis.

6. A light emitting device, comprising:
a light emitting element; and
the light flux controlling member according to claim 1, wherein
the light flux controlling member is disposed so that, the central axis coincides with an optical axis of the light emitting element.

7. A surface light source device, comprising:
the light emitting device according to claim 6; and
a light diffusion member that transmits light from the light emitting device while diffusing the light.

8. A display device, comprising:
the surface light source device according to claim 7; and
a display member to be illuminated with light emitted from the surface light source device.

9. A light flux controlling member that controls a distribution of light emitted from a light emitting element, the light flux controlling member comprising: a back surface disposed on a back side;
an incidence surface disposed on a back side so as to intersect a central axis of the light flux controlling member, the incidence surface being for allowing incidence of the light emitted from the light emitting element;
a reflection surface disposed on a front side so that a height of the reflection surface from the light emitting element increases as a distance of the reflection surface from the central axis increases, the reflection surface being for laterally reflecting the light incident on the incidence surface;
an annular groove that includes a first annular surface located farther from the central axis than the incidence surface is and disposed on the back side so as to surround the central axis, a second annular surface located farther from the central axis than the first annular surface is and disposed to be separated from the first annular surface, the first annular surface being disposed on a side of the central axis in the annular groove, and a third annular surface that links the first annular surface and the second annular surface to each other, the third annular surface being a flat surface disposed so that in a direction along the central axis a distance of an inner end of the third annular surface from the back surface being the same as a distance of an outer end of the third annular surface from the back surface; and
an emission surface located farther from the central axis than the annular groove is and disposed so as to surround the central axis, the emission surface being for emitting the light reflected by the reflection surface, wherein
the annular groove is disposed so as not to intersect an optical path of light emitted from a light emitting center of the light emitting element, incident on the incidence surface, reflected by the reflection surface, and then reaching the emission surface,
in a cross section including the central axis, the first annular surface is an inclining surface whose height from the light emitting element increases as a distance of the first annular surface from the central axis increases, the first annular surface refracting, toward the front side, light emitted from the light emitting center of the light emitting element, incident on the incidence surface, and then directly reaching the first annular surface,
in the cross section including the central axis, the second annular surface is an inclining surface whose height from the light emitting element increases as a distance of the second annular surface from the central axis decreases, the second annular surface refracting, toward the front side, light emitted from the light emitting element and directly reaching the second annular surface, and
the third annular surface is disposed so that light emitted from the light emitting element and not incident on the incidence surface does not directly reach the third annular surface.

10. The light flux controlling member according to claim 9, wherein the light emitted from the light emitting center of the light emitting element, incident on the incidence surface, reflected by the reflection surface, and then directly reaching the emission surface is emitted in a direction orthogonal to the central axis or in a direction tilting toward the back side compared to the direction orthogonal to the central axis.

11. The light flux controlling member according to claim 9, wherein:
the incidence surface includes
a first incident surface which is an inner surface of a recess formed so as to intersect the central axis, and
a second incidence surface disposed between an opening edge of the first incidence surface and the annular groove.

12. The light flux controlling member according to claim 9, wherein a bottom part of the annular groove is disposed closer to the front side than a portion of the reflection surface is, the portion intersecting the central axis.

13. The light flux controlling member according to claim 9, wherein the annular groove is rotationally symmetric about the central axis.

14. A light emitting device, comprising:
a light emitting element; and
the light flux controlling member according to claim 9, wherein
the light flux controlling member is disposed so that the central axis coincides with an optical axis of the light emitting element.

15. A surface light source device, comprising:
the light emitting device according to claim 14; and a light diffusion member that transmits light from the light emitting device while diffusing the light.

16. A display device, comprising:
the surface light source device according to claim 9; and
a display member to be illuminated with light emitted from the surface light source device.

17. A light flux controlling member that controls a distribution of light emitted from a light emitting element, the light flux controlling; member comprising:
an incidence surface disposed on a back side so as to intersect a central axis of the light flux controlling member, the incidence surface being for allowing incidence of the light emitted from the light emitting element;
a reflection surface disposed on a front side so that a height of the reflection surface from the light emitting element increases as a distance of the reflection surface from the central axis increases, the reflection surface being for laterally reflecting the light incident on the incidence surface;
an annular groove that includes a first annular surface located farther from the central axis than the incidence surface is and disposed on the back side so as to surround the central axis, and a second annular surface located farther from the central axis than the first annular surface is and disposed to be separated from the first annular surface, the first annular surface being disposed on a side of the central axis in the annular groove; and
an emission surface located farther from the central axis than the annular groove is and disposed so as to surround the central axis, the emission surface being for emitting the light reflected by the reflection surface, wherein the annular groove is disposed so as not to intersect an optical path of light emitted from a light emitting center of the light emitting element, incident on the incidence surface, reflected by the reflection surface, and then reaching the emission surface, in a cross section including the central axis, the first annular surface is an inclining surface whose height from the light emitting element increases as a distance of the first annular surface from the central axis increases, the first annular surface refracting, toward the front side, light emitted from the light emitting center of the light emitting element, incident on the incidence surface, and then directly reaching the first annular surface, in the cross section including the central axis, the second annular surface is an inclining surface whose height from the light emitting element increases as a distance of the second annular surface from the central axis decreases, the second annular surface refracting, toward the front side, light emitted from the light emitting element and directly reaching the second annular surface, and a bottom part of the annular groove is disposed closer to the front side than a portion of the reflection surface is, the portion intersecting the central axis.

* * * * *